United States Patent
Liu et al.

(10) Patent No.: US 9,158,145 B2
(45) Date of Patent: Oct. 13, 2015

(54) IN-CELL TOUCH PANEL AND COLOR FILTER SUBSTRATE THEREOF

(71) Applicant: Shanghai Tianma Micro-Electronics Co., Ltd., Shanghai (CN)

(72) Inventors: Baoling Liu, Shanghai (CN); Hao Chen, Shanghai (CN); Jun Ma, Shanghai (CN)

(73) Assignee: Shanghai Tianma Micro-Electronics Co., Ltd., Shanghai (CN)

( * ) Notice: Subject to any disclaimer, the term of this patent is extended or adjusted under 35 U.S.C. 154(b) by 135 days.

(21) Appl. No.: 14/085,753

(22) Filed: Nov. 20, 2013

(65) Prior Publication Data

US 2014/0078420 A1    Mar. 20, 2014

Related U.S. Application Data

(63) Continuation of application No. PCT/CN2013/074100, filed on Apr. 11, 2013.

(30) Foreign Application Priority Data

Aug. 17, 2012   (CN) .......................... 2012 1 0294943

(51) Int. Cl.
   *G02F 1/1335*   (2006.01)
   *G02F 1/1333*   (2006.01)
   *G02B 5/20*     (2006.01)
   *G06F 3/041*    (2006.01)
   *G06F 3/044*    (2006.01)

(52) U.S. Cl.
   CPC ............ *G02F 1/13338* (2013.01); *G02B 5/201* (2013.01); *G02F 1/133512* (2013.01); *G06F 3/044* (2013.01); *G06F 3/0412* (2013.01); *G02F 2201/12* (2013.01); *G06F 2203/04103* (2013.01)

(58) Field of Classification Search
   CPC .......................... G02F 1/13338; G06F 3/0412
   See application file for complete search history.

(56) References Cited

U.S. PATENT DOCUMENTS

2012/0188493 A1   7/2012   Sato et al.

FOREIGN PATENT DOCUMENTS

| CN | 101055368 A | 10/2007 |
| CN | 101403830 A | 4/2009 |
| CN | 101872086 A | 10/2010 |

*Primary Examiner* — Phu Vu
(74) *Attorney, Agent, or Firm* — Alston & Bird LLP

(57) ABSTRACT

A color filter device for in-cell touch panel is disclosed. The device includes a substrate, a black matrix with a plurality of openings that is formed on the substrate, and a plurality of sensing electrodes and a plurality of driving electrodes both formed on the black matrix. The sensing electrodes are independent of the driving electrodes, the black matrix is disconnected between the sensing electrodes and the driving electrodes, and the disconnected portion of the black matrix is blocked by an opaque material.

15 Claims, 8 Drawing Sheets

IN-CELL TOUCH PANEL AND COLOR FILTER SUBSTRATE THEREOF

CROSS-REFERENCES TO RELATED APPLICATIONS

This application claims priority to and is a continuation of PCT/CN2013/074100, filed on Apr. 11, 2013, and entitled "IN-CELL TOUCH PANEL AND COLOR FILTER SUBSTRATE THEREOF", which claims the benefit of Chinese Patent Application No. 201210294943.0 filed with the Chinese Patent Office on Aug. 17, 2012, and entitled "IN-CELL TOUCH PANEL AND COLOR FILTER SUBSTRATE THEREOF", the contents of which are incorporated herein by reference in their entirety.

FIELD OF THE INVENTION

The present invention relates to flat panel display technologies, in particular to an in-cell touch panel and a color filter substrate for the in-cell touch panel.

BACKGROUND OF THE INVENTION

The in-cell touch panel is very popular for effectively reducing the thicknesses of an entire liquid crystal display and simplifying the producing process of the liquid crystal display, because the touch system is integrated with a display screen in the in-cell touch panel. A liquid crystal display generally includes a color filter substrate and an array substrate, where many circuits are designed on the array substrate, and the touch system is usually positioned on the side of the color filter substrate in the in-cell touch panel.

As shown in FIG. 1, a color filter substrate 100 of the existing in-cell touch panel includes: a substrate 101; a black matrix 103 with a plurality of openings 102 that is located on the substrate 101; a plurality of sensing electrodes 104 and a plurality of driving electrodes 105, both of which are formed on the black matrix and independent of each other. The sensing electrodes 104 and the driving electrodes 105 intersect with each other, and a touch signal is generated when an intersection point between the sensing electrode 104 and the driving electrode 105 is touched by a finger.

In order for the color filter substrate 100 of the in-cell touch panel to produce touch signal normally, it is necessary that the sensing electrodes 104 are independent of the driving electrodes 105. As shown in FIG. 2, in the structure above, the sensing electrodes 104 and the driving electrodes 105 are formed on the black matrix 103 which is continuously distributed on the entire color filter substrate 100, therefore, the black matrix 103 connects the sensing electrodes 104 and the driving electrodes 105 together. If the black matrix 103 is made of a conductive material, the continuously distributed black matrix will likely cause the conduction between the sensing electrodes 104 and the driving electrodes 105, thus causing the malfunction of the in-cell touch panel.

BRIEF SUMMARY OF THE INVENTION

One inventive aspect is a color filter device for in-cell touch panel. The device includes a substrate, a black matrix with a plurality of openings that is formed on the substrate, and a plurality of sensing electrodes and a plurality of driving electrodes both formed on the black matrix. The sensing electrodes are independent of the driving electrodes, the black matrix is disconnected between the sensing electrodes and the driving electrodes, and the disconnected portion of the black matrix is blocked by an opaque material.

Another inventive aspect is an in-cell touch panel, including a color filter device for an in-cell touch panel. The in-cell touch panel includes a color filter substrate, a black matrix with a plurality of openings formed on the color filter substrate, and a plurality of sensing electrodes and a plurality of driving electrodes both formed on the black matrix. The sensing electrodes are independent of the driving electrodes. The black matrix is disconnected between the sensing electrodes and the driving electrodes, and the disconnected portion of the black matrix is blocked by an opaque material, an array substrate. In addition, a liquid crystal layer is disposed between the color filter device and the array substrate.

Another inventive aspect is a display device including an in-cell touch panel, which has an in-cell touch panel. The in-cell touch panel includes a color filter device for in-cell touch panel, which includes a color filter substrate, a black matrix with a plurality of openings formed on the color filter substrate, and a plurality of sensing electrodes and a plurality of driving electrodes both formed on the black matrix. The sensing electrodes are independent of the driving electrodes, the black matrix is disconnected between the sensing electrodes and the driving electrodes, and the disconnected portion of the black matrix is blocked by an opaque material. The color filter device also includes an array substrate and a liquid crystal layer disposed between the color filter device and the array substrate. The in-cell touch panel also includes a backlight module, and a driver board and a power board.

DETAILED DESCRIPTION OF THE INVENTION

During the manufacturing of an in-cell touch panel, the inventor of the present invention found the case that the sensing electrodes may be electrically conducted with the driving electrodes via the black matrix. Touch signals cannot be produced normally and the touch panel will be failed once the sensing electrodes are in conduction with the driving electrodes. In view of above consideration, the present invention provides a color filter substrate for in-cell touch panel, where the black matrix is disconnected between the sensing electrodes and the driving electrodes to eliminate the situation that the sensing electrodes are electrically conducted with the driving electrodes via the black matrix. Meanwhile, in order to prevent light leaking from the disconnected portion (i.e. a gap) of the black matrix, the disconnected portion of the black matrix is blocked by an opaque material.

In order for better understanding on objects, solutions, and advantages of the present invention, further detailed description will be given below in conjunction with accompanying drawings.

A First Embodiment

Figure 1:
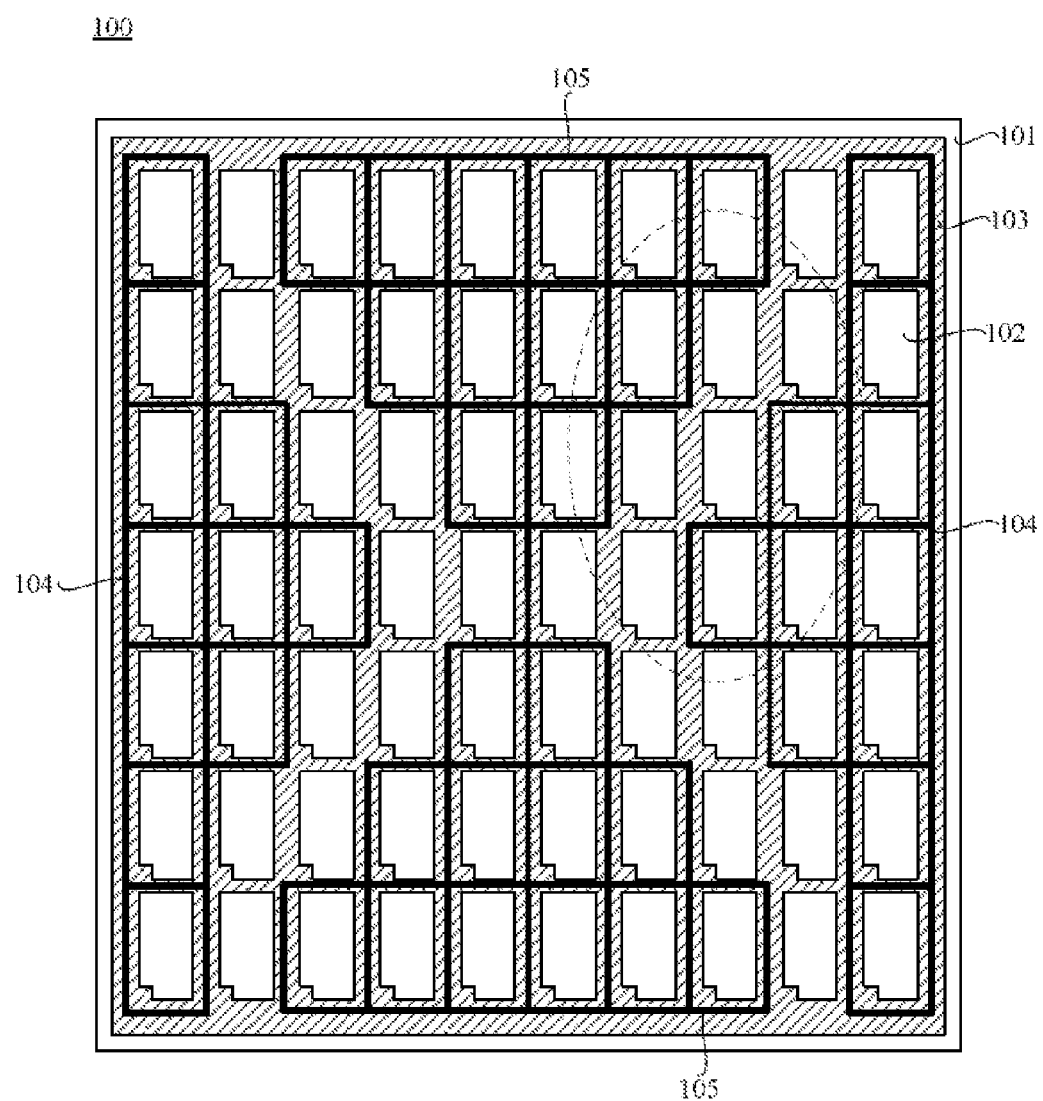
FIG. 1 is a top view of a color filter substrate for in-cell touch panel in the prior art.
Figure 2:
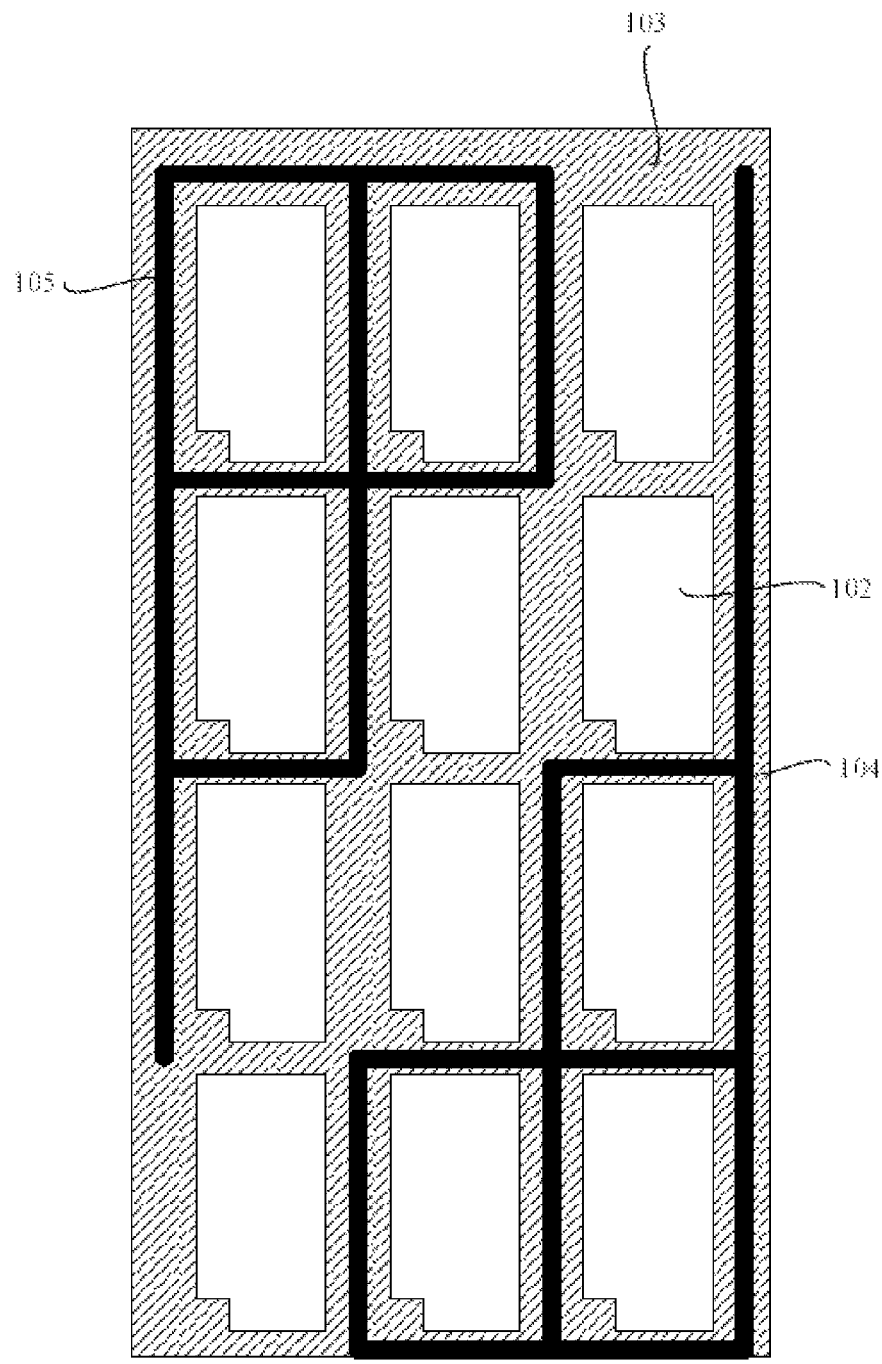
FIG. 2 is an enlarged view of a portion enclosed by a circle indicated by a broken line in FIG. 1.
Figure 3:
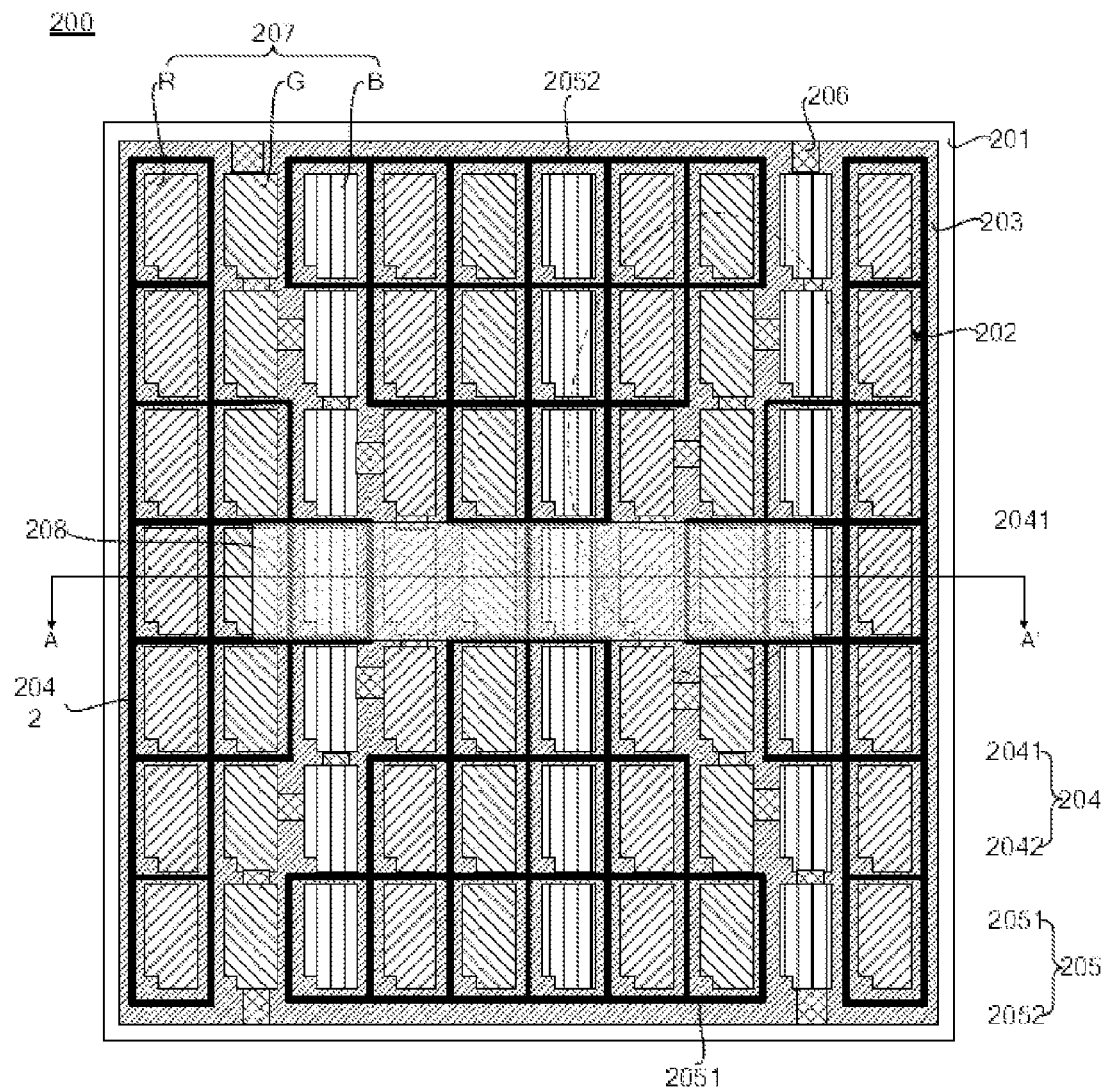
FIG. 3 is a top view of a color filter substrate for in-cell touch panel according to the first embodiment of the present invention.
Figure 4:
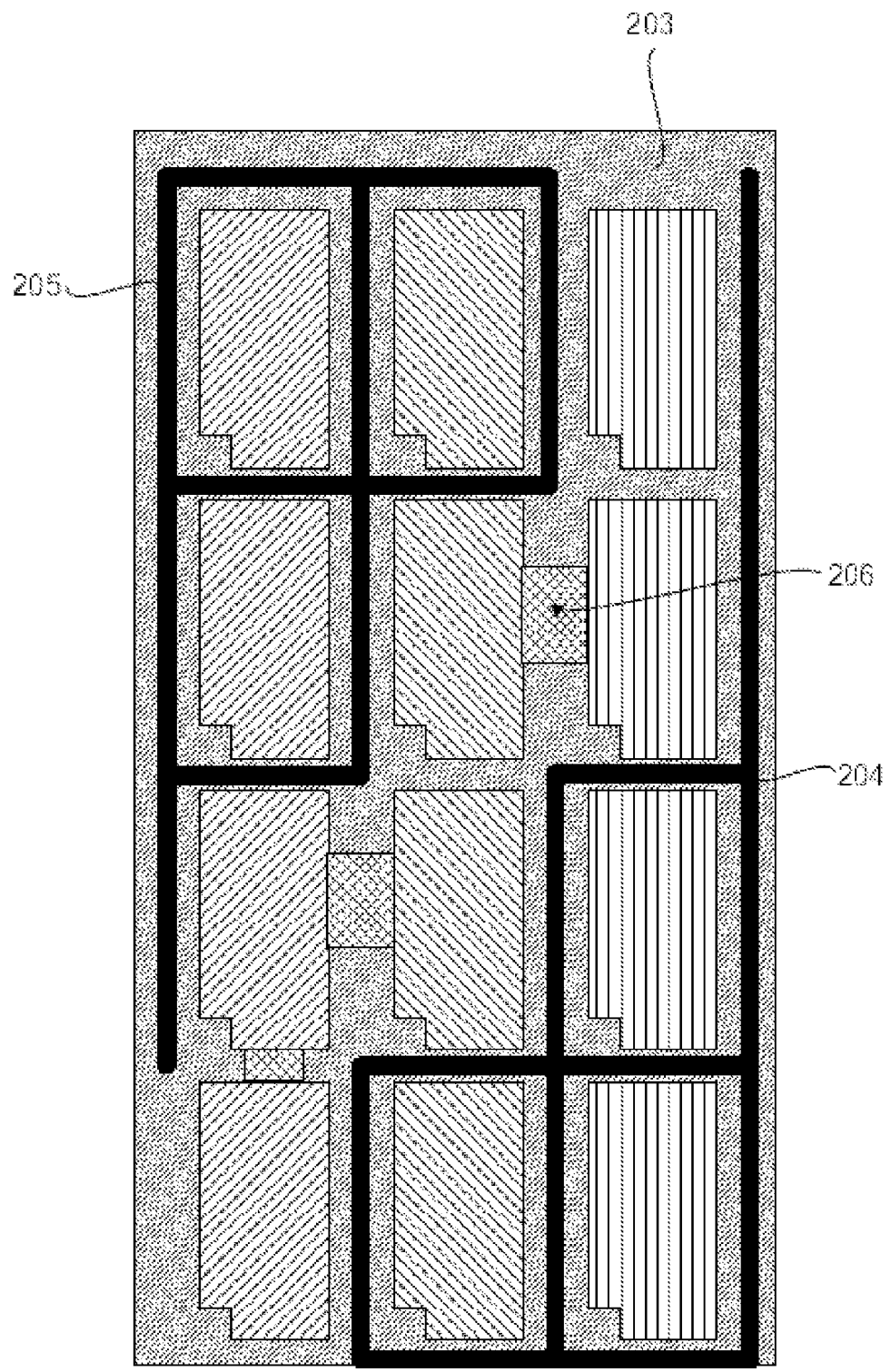
FIG. 4 is an enlarged view of a portion enclosed by a circle indicated by a broken line in FIG. 3.

As shown in FIGS. 3 and 4, a color filter substrate 200 for an in-cell touch panel in this embodiment includes: a substrate 201; a black matrix 203 with a plurality of openings 202 that is formed on the substrate 201; a plurality of sensing electrodes 204 and a plurality of driving electrodes 205 both formed on the black matrix 203, with the sensing electrodes 204 being independent of the driving electrodes 205. The black matrix is disconnected between the sensing electrodes 204 and the driving electrodes 205, and the disconnected portion of the black matrix is blocked by an opaque material 206.

As shown in FIG. 3, the color filter substrate 200 for an in-cell touch panel further includes a color filter layer 207 which is formed on the sensing electrodes 204 and the driving electrodes 205. The color filter layer 207 includes three kinds of color filters arranged at the openings 202 of the black matrix according to a predetermined pattern, i.e. a red color filter (R), a green color filter (G), and a blue color filter (B). Two kinds of color filters at two adjacent openings 202 each further extend to cover the disconnected portion of the black matrix between the two openings. Since light transmittance of any combined two kinds of color filters will be decreased significantly, the extending portions of the two kinds of color filters are utilized as the opaque material 206 in the present embodiment.

In general, the sensing electrodes 204 and the driving electrodes 205 may be made of either an opaque metal material or a transparent metal material. In this embodiment, the sensing electrodes 204 and the driving electrodes 205 are made of an opaque metal material. The opaque sensing electrodes 204 and the opaque driving electrodes 205 can only be formed in areas of the black matrix 203 other than the openings, otherwise, the sensing electrodes 204 and the driving electrodes 205 may block lights for displaying. Of course, in another embodiment, the sensing electrodes 204 and the driving electrodes 205 may be also made of a transparent metal material. The transparent sensing electrodes 204 and the transparent driving electrodes 205 may be formed in any area of the black matrix 203, which is more convenient for color filter substrate design.

Figure 5:
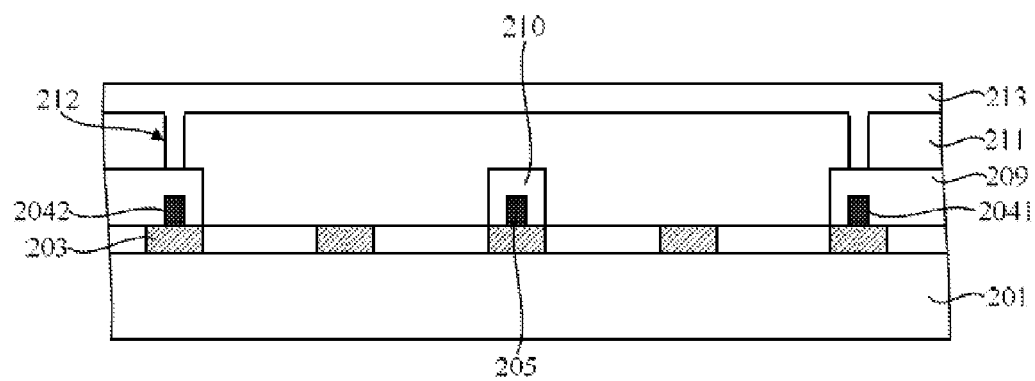
FIG. 5 is a sectional view taken along a line A-A' in FIG. 3.

As shown in FIG. 5, the sensing electrodes 204 include a first set of sensing electrodes 2041 and a second set of sensing electrodes 2042. The first set of sensing electrodes 2041 and the second set of sensing electrodes 2042 are located in two separate areas of the color filter substrate 200 for the in-cell touch panel, respectively. Likewise, the driving electrodes 205 include a first set of driving electrodes 2051 and a second set of driving electrodes 2052. The first set of driving electrodes 2051 and the second set of driving electrodes 2052 are located in two separate areas of the color filter substrate 200 for the in-cell touch panel, respectively. The first set of sensing electrodes 2041 and the second set of sensing electrodes 2042 are arranged in a direction perpendicular to that of the first set of driving electrodes 2051 and the second set of driving electrodes 2052. The first set of driving electrodes 2051 and the second set of driving electrodes 2052 are connected together by wirings at the same layer.

As shown in FIG. 5, in order to reduce resistance of the sensing electrodes 204, a first transparent conductive layer 209 is disposed on areas corresponding to the first set of sensing electrodes 2041 and the second set of sensing electrodes 2042. Likewise, in order to reduce resistances of the driving electrodes 205, a second transparent conductive layer 210 is disposed on areas corresponding to the first set of driving electrodes 2051 and the second set of driving electrodes 2052. Of course, in order to simplify the production process and save costs, the first transparent conductive layer 209 and the second transparent conductive layer 210 can be omitted in other embodiments.

With reference to both FIGS. 3 and 5, a planar layer 211 covering the first transparent conductive layer 209, the second transparent conductive layer 210, and the black matrix 203 at other areas is disposed in order to planarize the color filter substrate. At least two through-holes 212 are formed in the planar layer 211 corresponding to a part of the first set of sensing electrodes 2041 and a part of the second set of sensing electrodes 2042. A metal bridge 213 which connects the first set of sensing electrodes 2041 and the second set of sensing electrodes 2042 together through the through-holes 212 is formed on the planar layer 211 and in the through-holes 212.

Figure 6:
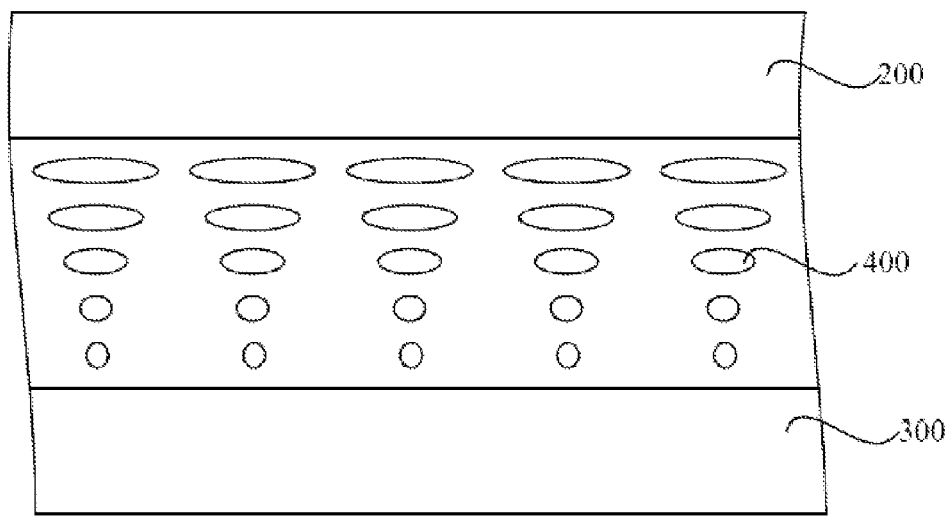
FIG. 6 is a schematic structural view of an in-cell touch panel according to the first embodiment of the present invention.

As shown in FIG. 6, accordingly, the present invention further provides an in-cell touch panel 20 including the above color filter substrate 200 for the in-cell touch panel, an array substrate 300, and a liquid crystal layer 400 disposed between the color filter substrate 200 and the array substrate 300.

In this embodiment, the disconnected portion of the black matrix and the opaque material are both integrated on the color filter substrate directly. Therefore, all associated designs between the disconnected portion of the black matrix and the opaque material involve a matching design of the color filter substrate, without impacting relevant design of the array substrate. Therefore, the array substrate can be designed more flexibly. Further, the manufacturing process of the color filter substrate will not interfere with the manufacturing process of the array substrate.

A Second Embodiment

A main difference between the first embodiment and the second embodiment is that the opaque material is disposed on the array substrate in the second embodiment.

Figure 7:
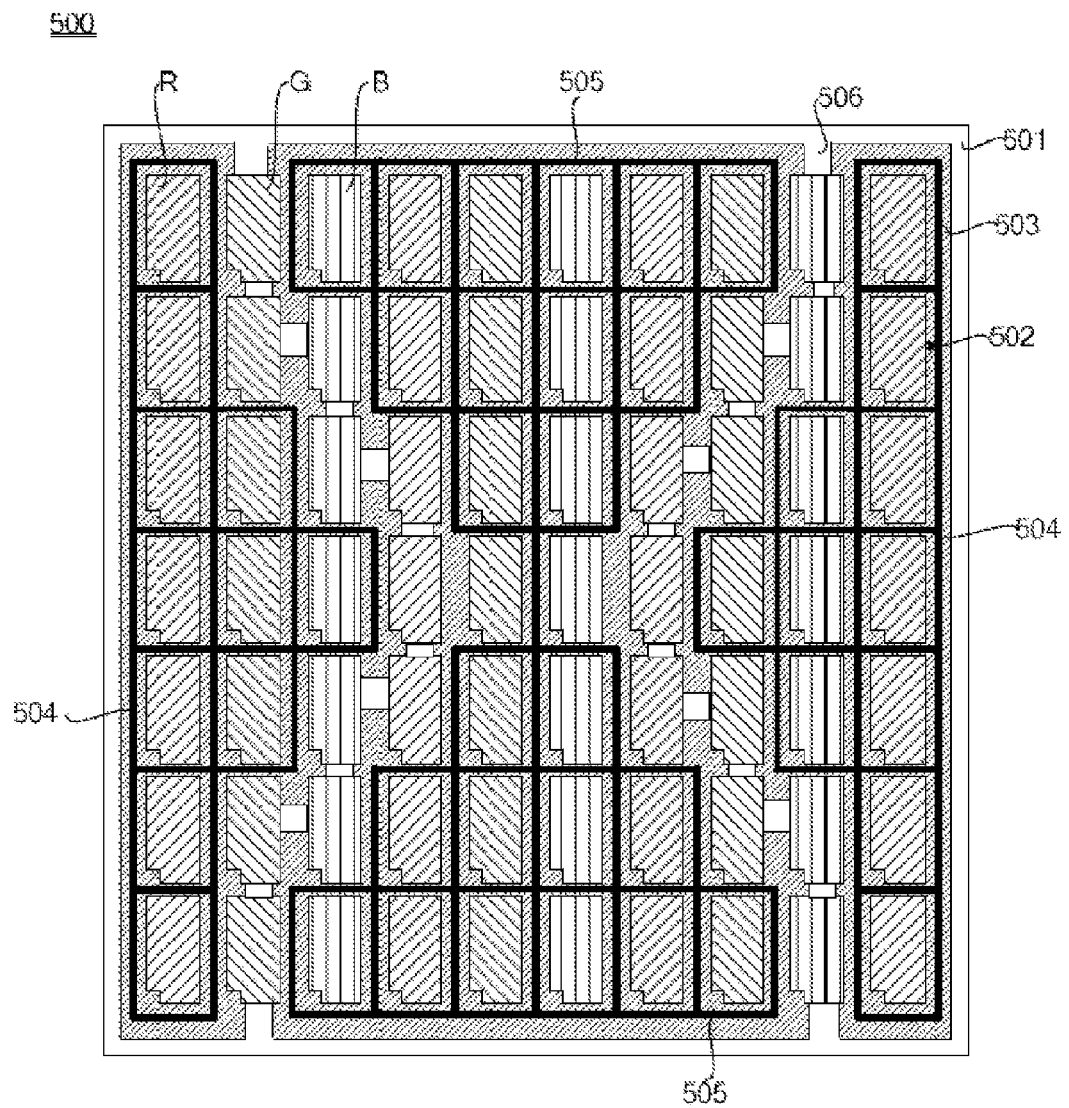
FIG. 7 is a top view of a color filter substrate for in-cell touch panel according to the second embodiment of the present invention.

As shown in FIG. 7, a color filter substrate 500 for an in-cell touch panel in this embodiment includes: a substrate 501; a black matrix 503 with a plurality of openings 502 that is formed on the substrate 501; and a plurality of sensing electrodes 504 and a plurality of driving electrodes 505 both formed on the black matrix 503, with the sensing electrodes 504 being independent of the driving electrodes 505. The black matrix 503 is disconnected between the sensing electrodes 504 and the driving electrodes 505.

Figure 8:
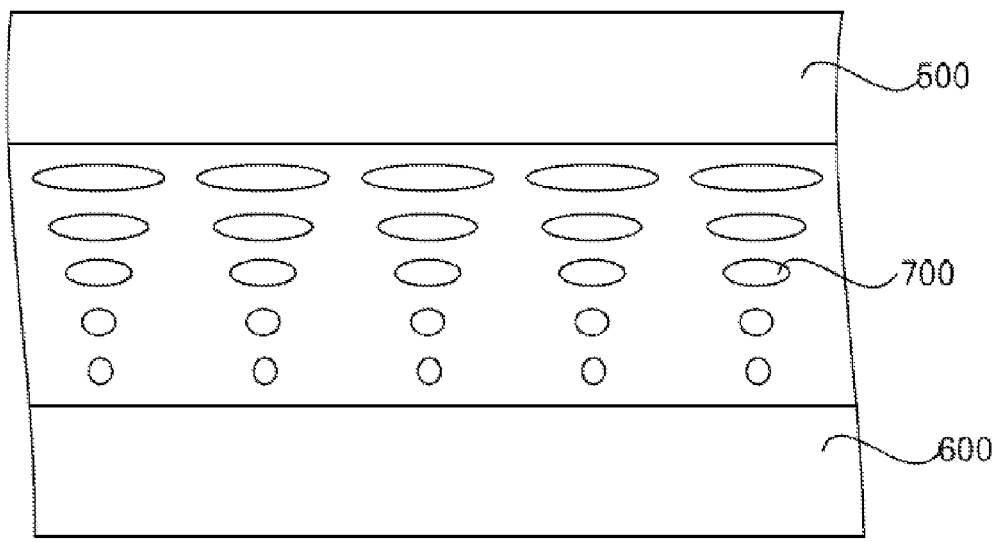
FIG. 8 is a schematic structural view of an in-cell touch panel according to the second embodiment of the present invention.

As shown in FIG. 8, accordingly, the present invention further provides an in-cell touch panel 30 including the above color filter substrate 500 for the in-cell touch panel, an array substrate 600, and a liquid crystal layer 700 disposed between the color filter substrate 500 and the array substrate 600.

Figure 9:
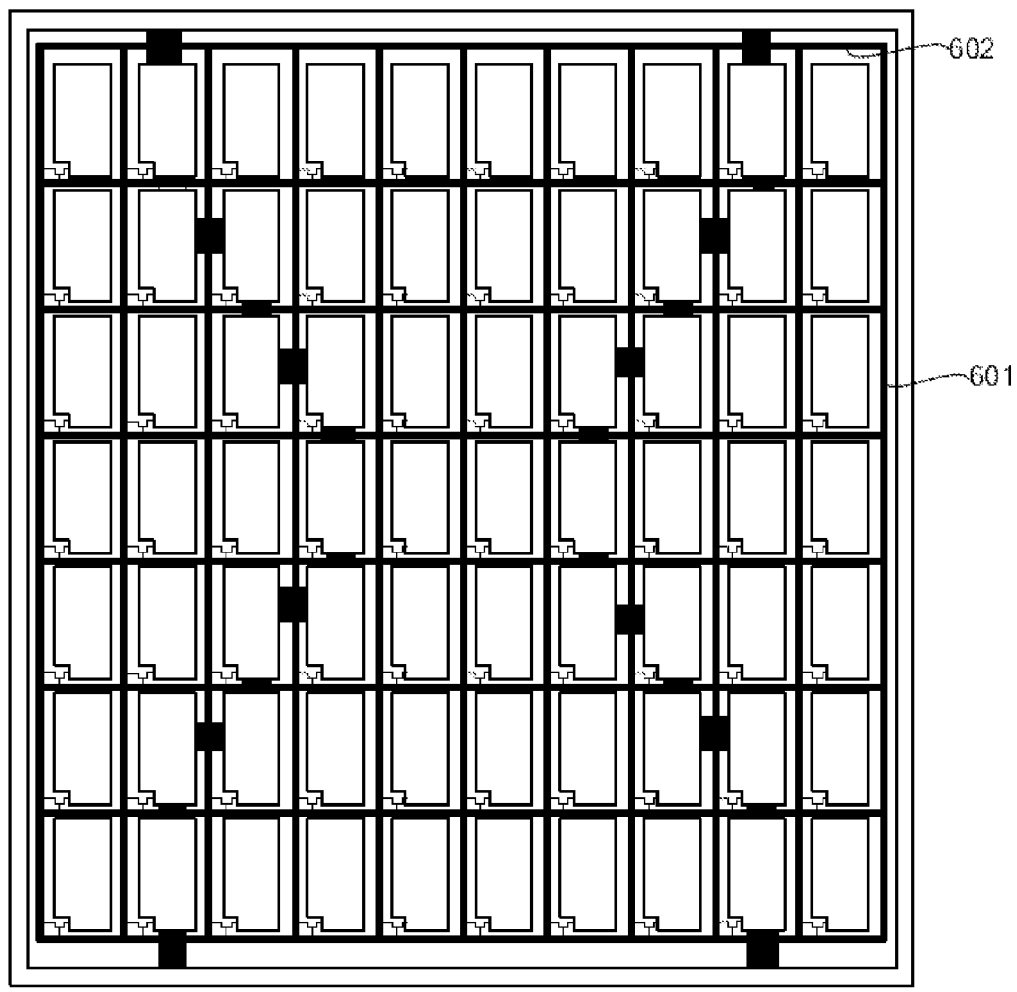
FIG. 9 is a top view of an array substrate for an in-cell touch panel according to the second embodiment of the present invention.

As shown in FIG. 9, a plurality of data lines 601 and a plurality of gate lines 602 are formed on the array substrate 600, and areas defined by the data lines 601 and the gate lines 602 correspond to the openings 502 of the black matrix. The gate line 602 corresponding to the disconnected portion of the black matrix is at least wide enough to cover the disconnected portion of the black matrix. The data line 601 corresponding to the disconnected portion of the black matrix is at least wide enough to cover the disconnected portion of the black matrix.

In this embodiment, the data line 601 or the gate line 602 corresponding to the disconnected portion of the black matrix is used as opaque material. In order to guarantee a light-blocking effect at the disconnected portion of the black matrix, both the data line 601 covering the disconnected portion of the black matrix and the gate line 602 covering the disconnected portion of the black matrix shall be made of an opaque material. Materials of data lines 601 and gate lines 602 corresponding to portions of the black matrix 503 other than the disconnected portion are not limited. It may be either an opaque material or a transparent material such as indium tin oxide. Of course, in order to simplify the producing process, all of the data lines 601 and the gate lines 602 may be made of opaque material. In particular, the data lines 601 and the gate lines 602 may be made of opaque metals such as chromium, aluminum and copper, or alloy made of two or more thereof.

In this embodiment, the opaque data lines and the opaque gate lines are made of opaque material. The light leaking from the disconnected portion of the black matrix can be blocked completely because the opaque data lines and the opaque gate lines are made of completely opaque metal materials. However, in the first embodiment, the overlapped extending portions of two kinds of adjacent color filters are used as the opaque materials. Only a portion but not all of lights can be blocked. For example, when the two adjacent color filters include a red color filter and a green color filter, yellow lights can still transmit through the overlapped extending portions of the read color filter and the green color filter. Therefore, the light-blocking effect of the opaque material in the second embodiment is superior to the light-blocking effect of the opaque material in the first embodiment.

As can be seen, the color filter substrate for in-cell touch panel provided in the present invention eliminates the case in which the sensing electrodes are electrically conducted with the driving electrodes via the black matrix, since the black matrix is disconnected between the sensing electrodes and the driving electrodes. Meanwhile, in order to prevent light leaking from the disconnected portion of the black matrix, the disconnected portion of the black matrix is blocked by an opaque material. In this way, the risk of electrically conducting the sensing electrodes with the driving electrodes is avoided, meanwhile no undesirable corresponding light leaking occurs.

It should be noted that, various embodiments of the present invention are described in a progressive way in which the emphases of each embodiment are put in difference with other embodiments. Therefore, reference may be made to other embodiments for similar parts between various embodiments.

It should be noted that, solutions in embodiments of the present invention can be used not only in LCDs with a TN display mode, but also LCDs with an FFS display mode or any other display modes.

Various changes and modifications can be made to the present invention by the person skilled in this art without departing from the concept and scope of the present invention. In this way, those changes and modifications of the present invention which fall into the scope of the claims of the present invention and equivalent technologies thereof are intended to be included in the present invention.

What is claimed is:

1. A color filter device for an in-cell touch panel, comprising:
   a substrate;
   a black matrix with a plurality of openings formed on the substrate; and
   a plurality of sensing electrodes and a plurality of driving electrodes both formed on the black matrix, wherein the sensing electrodes are independent of the driving electrodes,
   wherein the black matrix is disconnected between the sensing electrodes and the driving electrodes, and the disconnected portion of the black matrix is blocked by an opaque material.

2. The color filter device for in-cell touch panel according to claim 1, wherein the color filter substrate further comprises a color filter layer formed on the sensing electrodes and the driving electrodes.

3. The color filter device for in-cell touch panel according to claim 2, wherein, the color filter layer comprises three kinds of color filters arranged at the openings of the black matrix according to a predetermined pattern.

4. The color filter device for in-cell touch panel according to claim 3, wherein, two kinds of color filters at two adjacent openings each extend to cover the disconnected portion of the black matrix between the two openings, and the extending portions of the two kinds of color filters are used as the opaque material.

5. The color filter device for in-cell touch panel according to claim 1, wherein, both the sensing electrode and the driving electrode are each made of an opaque metal and formed in areas of the black matrix other than the openings.

6. An in-cell touch panel, comprising:
   a color filter device for an in-cell touch panel, comprising:
      a color filter substrate,
      a black matrix with a plurality of openings formed on the color filter substrate, and
      a plurality of sensing electrodes and a plurality of driving electrodes both formed on the black matrix, wherein the sensing electrodes are independent of the driving electrodes,
      wherein the black matrix is disconnected between the sensing electrodes and the driving electrodes, and the disconnected portion of the black matrix is blocked by an opaque material;
   an array substrate; and
   a liquid crystal layer disposed between the color filter device and the array substrate.

7. The in-cell touch panel according to claim 6, wherein a plurality of data lines and a plurality of gate lines are formed on the array substrate, and areas defined by the data lines and the gate lines correspond to the openings of the black matrix.

8. The in-cell touch panel according to claim 7, wherein the gate line corresponding to the disconnected portion of the black matrix is at least wide enough to cover the disconnected portion of the black matrix, and the gate line covering the disconnected portion of the black matrix is made of an opaque material.

9. The in-cell touch panel according to claim 7, wherein the data line corresponding to the disconnected portion of the black matrix is at least wide enough to cover the disconnected portion of the black matrix, and the data line covering the disconnected portion of the black matrix is made of an opaque material.

10. The in-cell touch panel according to claim 8, wherein, the gate line is made of an opaque metal.

11. The in-cell touch panel according to claim 9, wherein, the data line is made of an opaque metal.

12. A display device, comprising:
   an in-cell touch panel, comprising:

a color filter device for an in-cell touch panel, the in-cell touch panel comprising:
a color filter substrate,
a black matrix with a plurality of openings formed on the color filter substrate, and
a plurality of sensing electrodes and a plurality of driving electrodes both formed on the black matrix, wherein the sensing electrodes are independent of the driving electrodes,
wherein the black matrix is disconnected between the sensing electrodes and the driving electrodes, and the disconnected portion of the black matrix is blocked by an opaque material,
an array substrate, and
a liquid crystal layer disposed between the color filter device and the array substrate;
a backlight module; and
a driver board and a power board.

13. A display device according to claim 12, wherein a plurality of data lines and a plurality of gate lines are formed on the array substrate, and areas defined by the data lines and the gate lines correspond to the openings of the black matrix.

14. A display device according to claim 12, wherein the gate line corresponding to the disconnected portion of the black matrix is at least wide enough to cover the disconnected portion of the black matrix, and the gate line covering the disconnected portion of the black matrix is made of an opaque material.

15. A display device according to claim 12, wherein the data line corresponding to the disconnected portion of the black matrix is at least wide enough to cover the disconnected portion of the black matrix, and the data line covering the disconnected portion of the black matrix is made of an opaque material.

* * * * *